US009429958B2

(12) United States Patent
Asai

(10) Patent No.: US 9,429,958 B2
(45) Date of Patent: Aug. 30, 2016

(54) REGULATOR UNIT

(71) Applicant: TAIKOH CO., LTD., Toyota-Shi (JP)

(72) Inventor: Yasuharu Asai, Toyota (JP)

(73) Assignee: TAIKOH CO., LTD. (JP)

( * ) Notice: Subject to any disclaimer, the term of this patent is extended or adjusted under 35 U.S.C. 154(b) by 0 days.

(21) Appl. No.: 14/423,201

(22) PCT Filed: Jul. 16, 2014

(86) PCT No.: PCT/JP2014/068892
§ 371 (c)(1),
(2) Date: Feb. 23, 2015

(87) PCT Pub. No.: WO2015/019812
PCT Pub. Date: Feb. 12, 2015

(65) Prior Publication Data
US 2016/0139611 A1    May 19, 2016

(30) Foreign Application Priority Data
Aug. 5, 2013  (JP) .................................. 2013-162589

(51) Int. Cl.
*G05D 16/06*    (2006.01)
*F16K 31/60*    (2006.01)

(52) U.S. Cl.
CPC ......... *G05D 16/0636* (2013.01); *F16K 31/602* (2013.01); *G05D 16/06* (2013.01); *Y10T 137/7793* (2015.04); *Y10T 137/7809* (2015.04)

(58) Field of Classification Search
CPC .. G05D 16/04; G05D 16/06; G05D 16/0636; G05D 16/10; Y10T 137/7809; Y10T 137/7793; F16K 31/602
See application file for complete search history.

(56) References Cited

U.S. PATENT DOCUMENTS

| 1,480,909 A | * | 1/1924 | Johnson | ................. | G05D 16/10 116/271 |
| 1,637,085 A | * | 7/1927 | Nichols | ..................... | B60S 5/04 137/224 |

(Continued)

FOREIGN PATENT DOCUMENTS

| JP | S60-190622 | 6/1987 |
| JP | S63-105602 | 5/1988 |
| JP | 2007039219 A | 2/2007 |

OTHER PUBLICATIONS

International Search Report A; PCT/JP2014/068892; International Filing Date: Jul. 16, 2014; 2 pgs.

*Primary Examiner* — Kevin Murphy
*Assistant Examiner* — Richard K Durden
(74) *Attorney, Agent, or Firm* — Schmeiser, Olsen & Watts, LLP

(57) ABSTRACT

A regulator unit which includes a regulator main body, and a pressure-regulating mechanism part, being installed consecutively thereto; the pressure-regulating mechanism part being constituted by a cylindrical housing provided with a shouldered hole, the shouldered hole being formed by a smaller-diameter bore and a larger-diameter bore, the smaller-diameter bore accommodating an adjusting spring and an end cover; a ball screw being disposed in the larger-diameter bore; an operation handle being mounted to a basal end part of a threaded rod of the ball screw through a fastener; and the operation handle being capable of being turned for expanding or contracting said adjusting spring to thereby change the spring pressure applied to a diaphragm receiving plate.

5 Claims, 3 Drawing Sheets

(56) References Cited

U.S. PATENT DOCUMENTS

| | | | | |
|---|---|---|---|---|
| 2,447,067 A | * | 8/1948 | Hamilton | G05D 16/0663 |
| | | | | 137/505.42 |
| 2,642,892 A | * | 6/1953 | Simons | G05D 16/10 |
| | | | | 137/529 |
| 4,147,179 A | | 4/1979 | Miura | |
| 4,325,535 A | * | 4/1982 | Foster | F16H 25/2204 |
| | | | | 251/58 |
| 4,569,503 A | * | 2/1986 | Karr, Jr. | F16K 31/1221 |
| | | | | 137/556.3 |
| 5,492,146 A | * | 2/1996 | George | G05D 16/0655 |
| | | | | 137/505.41 |
| 6,003,545 A | * | 12/1999 | Dukas | F16K 27/02 |
| | | | | 137/375 |
| 7,849,877 B2 | * | 12/2010 | Tan | F16K 11/0853 |
| | | | | 137/625.46 |

\* cited by examiner

REGULATOR UNIT

CROSS-REFERENCE TO RELATED APPLICATIONS

This application claims priority to PCT Application No. PCT/JP2014/068892, having a filing date of Jul. 16, 2014, based on JP Application No. 2013-162589 having a filing date of Aug. 5, 2013, the entire contents of which are hereby incorporated by reference.

FIELD OF TECHNOLOGY

The following relates to a regulator unit, and more particularly relates to a regulator unit which, when a lifting table loaded with a workpiece is lifted or lowered with a cylinder at, for example, an automobile assembling plant, or the like, allows obtaining a desired lifting or lowering speed, or stopping the workpiece at a desired position by making a simple operation for controlling the fluid pressure to be supplied to the cylinder.

BACKGROUND

For example, with a mechanism using an air cylinder to lift or lower a lifting table on which a workpiece is loaded, as described above, a constant air pressure is supplied to the air cylinder, however, in order to maintain the lifting or lowering speed of the lifting table constant, the air pressure supplied to the air cylinder must be constantly changed. But, since there had existed a difference between such required air pressure, i.e., an air pressure to be constantly varied, and the supplied constant air pressure, the lifting or lowering speed of the lifting table had been incapable of being maintained constant, thereby various inconveniences had been caused.

Then, in order to avoid such inconveniences, there has been proposed a cylinder pressure adjusting unit which allows the lifting or lowering speed of a lifting table, or the like, to be maintained substantially constant by adjusting the fluid pressure supplied to a cylinder through a regulator (Patent Document 1: Japanese Patent No. 4729359).

The cylinder pressure adjusting unit is a cylinder pressure adjusting unit which adjusts the fluid pressure supplied to a cylinder by means of a regulator, being provided with a pressure switching means between the rod of the cylinder and the regulator to allow the setting pressure for the regulator to be freely switched in accordance with the advance/retraction motion of the cylinder rod. The pressure switching means includes an adjusting spring which is provided in the regulator, being expanded or contracted to thereby switch the setting pressure to the cylinder, and a connection member comprised of a rack and a spur gear engaged therewith for expanding or contracting the adjusting spring.

However, this cylinder pressure adjusting unit presents problems that it has a number of component parts, providing a complex and large construction; especially that the rod of the air cylinder for initial pressure setting is largely protruded, thereby a space covering the protrusion being required; and that it is difficult to steplessly change the cylinder pressure for lifting or lowering the workpiece at a desired speed, or rapidly positioning the workpiece to stop it at a desired position.

SUMMARY

As described above, the above-mentioned conventional cylinder pressure adjusting unit has a number of component parts, providing a complex and large construction; the rod of the air cylinder for initial pressure setting is largely protruded, thereby a space covering the protrusion being required; and further it has been difficult to steplessly change the cylinder pressure for lifting or lowering the workpiece at a desired speed, or rapidly positioning the workpiece to stop it at a desired position.

An aspect relates to a regulator unit which has a simple and compact configuration, allowing the cylinder pressure to be steplessly changed for lifting or lowering a workpiece at a desired speed, or rapidly positioning the workpiece to stop it at a desired position.

A further aspect relates to a regulator unit, being disposed between a driving cylinder and a fluid pressure supply source, including:

a regulator main body, and a pressure-regulating mechanism part, being installed consecutively to said regulator main body, said pressure-regulating mechanism part being constituted by a cylindrical housing provided with a shouldered hole, the shouldered hole being formed by a smaller-diameter bore and a larger-diameter bore, the smaller-diameter bore accommodating an adjusting spring; an end cover, closing an end face of said cylindrical housing, the end face being opposite to a face for mounting said regulator main body; and an operation handle, being disposed outside of said end cover and acting on said adjusting spring, a ball screw being disposed in said larger-diameter bore, said operation handle being mounted to a basal end part of a threaded rod of the ball screw through a fastener, and said operation handle being capable of being turned for expanding or contracting said adjusting spring to thereby change the spring pressure applied to a diaphragm receiving plate fixed to a diaphragm in said regulator, and said threaded rod being capable of being turned with said fastener being loosened to thereby change the spring pressure applied to said diaphragm receiving plate, while setting the initial pressure to be applied to said driving cylinder.

In one embodiment, between a threaded rod distal end face of said ball screw and said adjusting spring, a sliding piece holding a steel ball, sliding in said smaller-diameter bore, is disposed, said threaded rod distal end face being abutted against said steel ball.

In another embodiment, said fastener for mounting said operation handle to said threaded rod is a friction type fastener, and said operation handle is provided with a capability of automatically returning to the center position after turning operation thereof. Further, a hexagonal screw is fixed to a basal end face of said threaded rod, or the basal end part thereof is formed in the shape of a hexagonal screw, or a hexagonal screw hole is provided in the basal end face thereof.

The aspect is as described above, and offers advantages that the construction is simple and compact; that there is no protruding obstacle; yet that a driving cylinder equipped with the present unit can be accurately and steplessly adjusted for cylinder pressure with a simple handle operation; that the workpiece can be lifted or lowered at a desired speed, or rapidly positioned to be stopped at a desired position; and that the initial pressure setting for the driving cylinder can be easily performed.

BRIEF DESCRIPTION

Some of the embodiments will be described in detail, with reference to the following figures, wherein like designations denote like members, wherein.

DETAILED DESCRIPTION

An embodiment of the present invention will be explained with reference to the attached drawings. A regulator unit in accordance with embodiments of the present invention is disposed between a driving cylinder and a fluid pressure supply source at, for example, an automobile assembling plant, or the like, to control the fluid pressure supplied to a driving cylinder, or the like, for lifting- or lowering-driving a lifting table on which a workpiece is loaded. The fluid pressure is an air pressure or a hydraulic pressure, and here the case where the air pressure is used will be explained, however, also in the case where the hydraulic pressure is used, the same working effects can be obtained.

Figure 1:
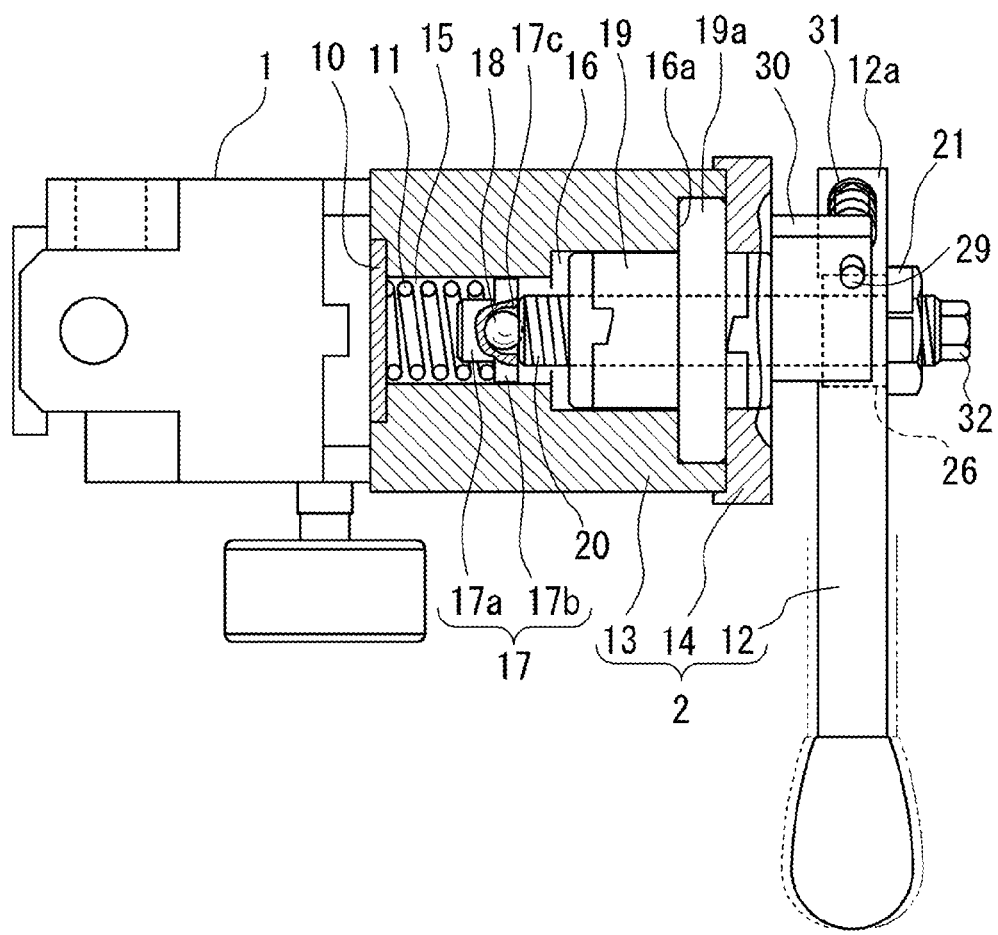
FIG. 1 is a plan view, with portions being broken away, illustrating a configuration of one embodiment of a regulator unit.

As shown in FIG. 1, this regulator unit is comprised of a regulator main body 1 and a pressure-regulating mechanism part 2, which is installed consecutively thereto. The regulator main body 1 is disposed in, for example, an air supply passage between a driving air cylinder and an air tank (which are not shown), having an air inflow port (on the primary side) communicating to the air tank and an air outflow port (on the secondary side) connected to the driving air cylinder. In the regulator main body 1, a diaphragm is disposed so as to be contacted with the air flow passage on the primary side and the secondary side, a diaphragm receiving plate 10 fixed to the diaphragm being exposed on the pressure-regulating mechanism part 2 side.

The pressure-regulating mechanism part 2 is configured to include a cylindrical housing 13, accommodating an adjusting spring 11; an end cover 14, closing an end face of the cylindrical housing 13 that is opposite to a face for mounting the regulator main body 1; and an operation handle 12, being mounted outside of the end cover 14. In the cylindrical housing 13, there is provided a shouldered hole having two shouldered parts, one of which is formed by a smaller-diameter bore 15 and a larger-diameter bore 16, and the other of which is formed on the inlet side (as later described), and the adjusting spring 11 is accommodated in the smaller-diameter bore 15, opening on the regulator main body 1 side, in an expandable and contractible manner.

One end face of the adjusting spring 11 is abutted against the diaphragm receiving plate 10, while the other end face thereof is abutted against a sliding piece 17, the resilient force thereof being applied to the diaphragm receiving plate 10 and the sliding piece 17. The sliding piece 17 is formed of a shaft part 17a and a flange part 17b, the shaft part 17a being accommodated in the inside of the adjusting spring 11, and the flange part 17b receiving the end face of the adjusting spring 11, thereby the sliding piece 17 being always urged by the adjusting spring 11. In the central portion of the flange part 17b, a steel ball holding recess part 17c is formed, and therein, a steel ball 18 is accommodated and held in a movable manner. The sliding piece 17 slides in the smaller-diameter bore 15, while the circumferential face of the flange part 17b thereof sliding on the inner circumferential face of the smaller-diameter bore 15.

Into the larger-diameter bore 16 consecutive to the smaller-diameter bore 15, a ball screw comprised of a flanged nut 19 and a threaded rod 20 is fitted. The flanged nut 19 is fitted into the larger-diameter bore 16 in such a manner that a flange part 19a thereof is seated on a shouldered part 16a formed on the inlet side of the larger-diameter bore 16, being pressed and held by the end cover 14, which closes the end face of the cylindrical housing 13. The threaded rod 20 is screwed into the flanged nut 19 such that the distal end face of the threaded rod 20 is abutted against the steel ball 18, which is accommodated in the steel ball holding recess part 17c.

Here, the reasons why there has been given a design that the distal end face of the threaded rod 20 is abutted against the spherical surface of the steel ball 18 rather than not directly being abutted against the flange part 17b are to minimize the friction of the distal end face of the threaded rod 20 for securing smooth turning of the threaded rod 20, and prevent the distal end of the threaded rod 20 and the flange part 17b from being worn with time.

Figure 3:
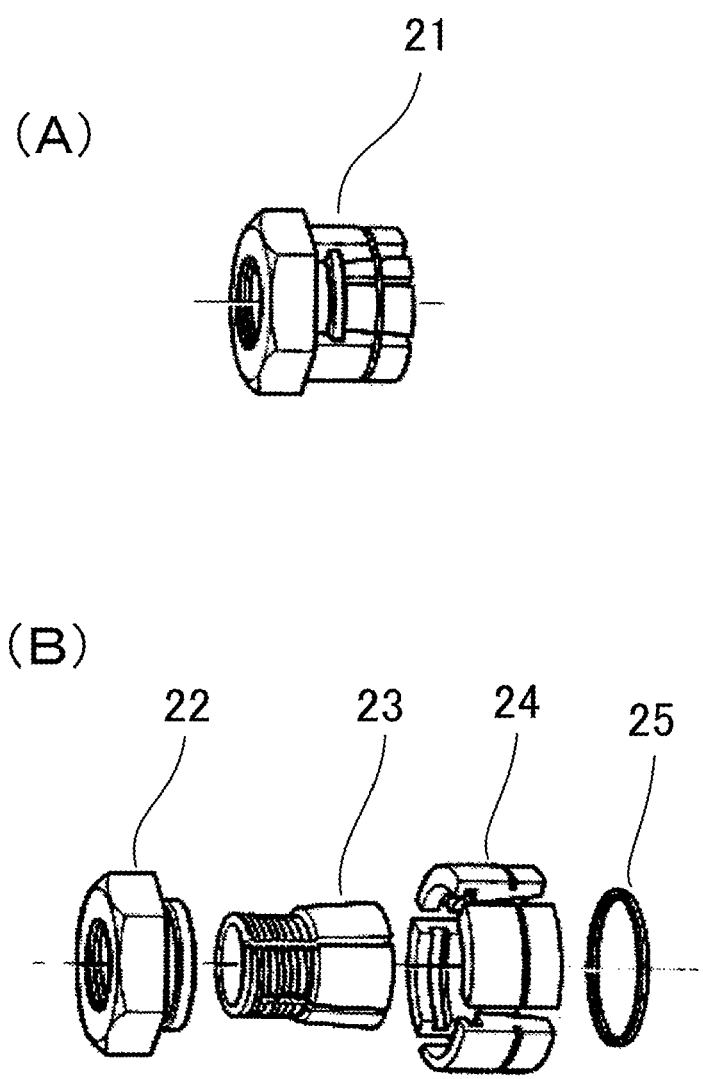
FIG. 3 is an explosive perspective view showing an example of configuration of a fastener for use with the regulator unit.

To the basal end part of the threaded rod 20, an operation handle 12 is mounted through a fastener 21. As the fastener 21, it is recommended to use a friction type fastener (power lock) which is comprised of a nut 22; an inner ring 23 which has slots and one half part of which is screwed into the nut 22; an outer ring 24 which is assembled to the nut 22 to cover the other half part of the inner ring 23; and a ring spring 25 which is engaged around the outer ring 24, which is divided into a plurality of pieces (see FIG. 3).

With this power lock, the threaded rod 20 of the ball screw is inserted into the inner ring 23, and the outer ring 24 is fitted into a round hole 26, being formed in the operation handle 12, thereby the operation handle 12 being firmly mounted to the basal end part of the threaded rod 20 (see FIG. 1). The circumferential faces of the inner ring 23 and the outer ring 24 that are abutted against each other are provided as tapered circumferential faces which are mated to each other, and therefore, with the nut 22 being screwed in or out, the outer ring 24 is moved forward or backward with respect to the inner ring 23, thereby the fastening force applied by the inner ring 23 to the threaded rod 20 being increased or decreased, and the pressing force applied to the circumferential face of the round hole 26 in the operation handle 12 by the outer ring 24 being increased or decreased.

With the threaded rod 20, a hexagonal screw 32 is fixed to the basal end face thereof, or the basal end part thereof is formed in the shape of a hexagonal screw, or a hexagonal screw hole is provided in the basal end face thereof. Thus, the threaded rod 20 is adapted to be easily turned by means of the hexagonal screw 32 portion thereof or the hexagonal screw hole. The turning operation of the threaded rod 20 is performed with the nut 22 being loosened.

The operation handle 12 is set to be rockable in the range of, for example, 45 degrees (in the range of 22.5 degrees in the upward or downward direction from the center in the horizontal state), and is equipped with a centering mechanism which causes the operation handle 12 to be automatically returned to the center from the rocked position.

As the centering mechanism, there is a possible configuration, for example, in which a pair of stopper mounting members 30, 30a, being provided with stoppers 29, 29a which define the rocking ends of the operation handle 12, are fixed to the end cover 14; a return spring 31, 31a is provided for the respective stoppers 29, 29a in a wearing manner; and the end of the return spring 31, 31a is pressure-contacted with the distal end protruded part 12a of the operation handle 12. Since the restoring force of the adjusting spring 11 is applied to the threaded rod 20 through the sliding piece 17, the return spring 31a, which is one of the pair, is not necessary, and if it is installed, a spring pressure weaker than that of the return spring 31 will suffice therefor.

Figure 2:
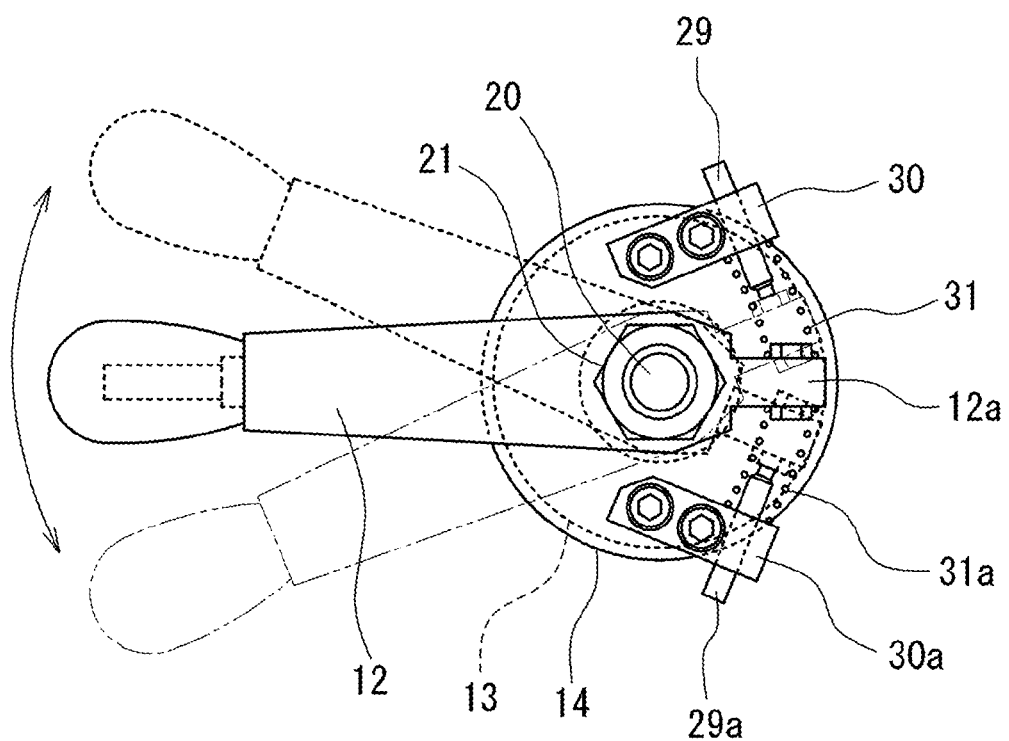
FIG. 2 is a side view illustrating the configuration of the one embodiment of the regulator unit.

With this centering mechanism, when the operation handle 12 positioned in the center shown with a solid line in FIG. 2 is turned downward against the resilient force of the return spring 31 (see the two-dot chain line), the return spring 31 is pressed to be contracted until the distal end protruded part 12a of the operation handle 12 is abutted against the stopper 29, any further turning being suppressed. Then, if the downward force which is being applied to the operation handle 12 in that position is released, the operation handle 12 is pushed by the resilient force of the return spring 31 to be returned to the center.

Contrarily, in the case where the operation handle 12 is turned upward (see the dashed line), the operation of the operation handle 12 is performed against the resilient force of the adjusting spring 11 and the return spring 31a, and releasing the upward force which is being applied to the operation handle 12 will cause the operation handle 12 to be returned to the center by the resilient force of the adjusting spring 11 and the return spring 31a. In this case, the operation handle 12 can return to the center by the action of the adjusting spring 11 alone, and thus as described above, the return spring 31a may be omitted. As described later, the operation handle 12 is slightly advanced or retracted in the axial direction of the threaded rod 20 with the turning operation thereof (between the dashed line and the two-dot chain line in FIG. 1), however, the restoring force of the adjusting spring 11 will contribute to the retraction operation.

In the case where the regulator unit in accordance with embodiments of the present invention that is configured as described above is disposed in, for example, the air supply passage for a driving air cylinder for lifting or lowering of a lifting table for workpiece lifting or lowering, the adjusting spring 11 is first expanded or contracted to set, on the regulator main body 1, the initial pressure to be supplied to the driving air cylinder with no load being imposed on the driving air cylinder (there being no workpiece on the lifting table) and with a load being imposed on the driving air cylinder (there being a workpiece on the lifting table).

The setting is performed by, in the state where the fastener 21 is loosened, turning the threaded rod 20 through the hexagonal screw 32 to expand or contract the adjusting spring 11 to thereby increase or decrease the spring pressure applied to the diaphragm receiving plate 10, while observing the balance condition of the lifting table, and upon the lifting table being well balanced, positioning the operation handle 12 in the center, then tightening the fastener 21 to fix the operation handle 12 in that position.

After, as described above, the initial pressure having been set for the time when there is a workpiece and for that when there is no workpiece, the driving air cylinder is operated; then, the corresponding initial pressure is supplied to the driving air cylinder to start lifting or lowering driving of the lifting table. Thereafter, by turning the operation handle 12 to change the setting pressure for the regulator main body 1 as required, the lifting or lowering speed of the lifting table can be maintained constant, or changed, or the lifting table can be stopped at a desired position.

Specifically, turning the operation handle 12 upward will advance the threaded rod 20, thereby the load imposed on the adjusting spring 11 being increased, and thus the secondary pressure being raised, resulting in the lifting or lowering speed being increased, and contrarily to this, turning the operation handle 12 downward will retract the threaded rod 20, thereby the load imposed on the adjusting spring 11 being decreased, and thus the secondary pressure being lowered, resulting in the lifting or lowering speed being decreased.

The rate of change in lifting or lowering speed of the lifting table at that time depends upon the turning speed of the operation handle 12. Therefore, by turning the operation handle 12 upward to a certain appropriate level in one go, the lifting table can be rapidly lifted to a certain appropriate level, and at that level, by changing the turning speed of the operation handle 12 into a fine speed, the lifting table can be caused to reach a desired position and be stopped at the position, whereby the time required for moving the lifting table upward can be minimized. In the same manner, the lifting table can be moved to and stopped in a downward position in a minimum required time.

After having turned the operation handle 12 as described above, weakening the force applied to the operation handle 12 or releasing the hand therefrom will cause the operation handle 12 to be immediately returned to the center position by the restoring force of the return spring 31, 31a and that of the adjusting spring 11.

Hereinabove, embodiments of the present invention have been explained in detail to some extent, and about the most preferred embodiment, however, it is obvious that a wide range of different embodiments can be made without departing from the spirit and scope of embodiments of the present invention. Therefore, it is to be understood that embodiments of the present invention is not limited to the specific embodiments thereof except as defined in the appended claims.

Description of Symbols

The symbol 1 denotes a regulator main body; 2 a pressure-regulating mechanism part; 10 a diaphragm receiving plate; 11 an adjusting spring; 12 an operation handle; 13 a cylindrical housing; 14 an end cover; 15 a smaller-diameter bore; 16 a larger-diameter bore; 17 a sliding piece; 17a a shaft part; 17b a flange part; 17c a steel ball holding recess part; 18 a steel ball; 19 a flanged nut; 19a a flange par; 20 a threaded rod; 21 a fastener; 22 a nut; 23 an inner ring; 24 an outer ring; 25 a ring spring; 26 a round hole; 29, 29a a stopper; 30, 30a a stopper mounting member; 31, 31a a return spring; and 32 a hexagonal screw.

The invention claimed is:

1. A regulator unit, being disposed between a driving cylinder and a fluid pressure supply source, comprising:
   a regulator main body, and a pressure-regulating mechanism part, attached to said regulator main body,
   said pressure-regulating mechanism part being constituted by a cylindrical housing provided with a shouldered hole, the shouldered hole being formed by a smaller-diameter bore and a larger-diameter bore, the smaller-diameter bore accommodating an adjusting spring; an end cover, closing an end face of said cylindrical housing, the end face being opposite to a face for mounting said regulator main body; and an operation handle, being disposed outside of said end cover and acting on said adjusting spring,
   a ball screw being disposed in said larger-diameter bore, said operation handle being mounted to a basal end part of a threaded rod of the ball screw through a fastener, and
   said operation handle being capable of being turned for expanding or contracting said adjusting spring to thereby change the spring pressure applied to a diaphragm receiving plate fixed to a diaphragm in said regulator, and said threaded rod being capable of being turned with said fastener being loosened to thereby change the spring pressure applied to said diaphragm receiving plate, while setting the initial pressure to be applied to said driving cylinder.

2. The regulator unit according to claim 1, wherein between a threaded rod distal end face of said ball screw and said adjusting spring, a sliding piece holding a steel ball, sliding in said smaller-diameter bore, is disposed, said threaded rod distal end face being abutted against said steel ball.

3. The regulator unit according to claim 1, wherein said fastener for mounting said operation handle to said threaded rod is a friction type fastener.

4. The regulator unit according to claim 1, wherein said operation handle is provided with a capability of automatically returning to the center position after turning operation thereof.

5. The regulator unit according to claim 1, wherein a hexagonal screw is fixed to a basal end face of said threaded rod, or the basal end part thereof is formed in the shape of a hexagonal screw, or a hexagonal screw hole is provided in the basal end face thereof.

* * * * *